(12) United States Patent
Suzuki

(10) Patent No.: US 6,608,455 B2
(45) Date of Patent: *Aug. 19, 2003

(54) DRIVING APPARATUS FOR VIBRATION TYPE MOTOR AND VIBRATION TYPE MOTOR DRIVING CONTROL METHOD

(75) Inventor: Ryoichi Suzuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,254

(22) Filed: May 11, 2000

(65) Prior Publication Data

US 2003/0001529 A1 Jan. 2, 2003

(30) Foreign Application Priority Data

May 18, 1999 (JP) .............................. 11-137094

(51) Int. Cl.$^7$ .............................. H02K 33/00; H02P 1/00
(52) U.S. Cl. ...................................... 318/114; 318/126
(58) Field of Search ............................... 318/114; 77/126

(56) References Cited

U.S. PATENT DOCUMENTS

| | | | |
|---|---|---|---|
| 4,793,689 A | 12/1988 | Aoyagi et al. | 350/255 |
| 5,136,215 A * | 8/1992 | Izukawa | 318/116 |
| 5,216,314 A | 6/1993 | Suzuki | 310/323 |
| 5,264,769 A * | 11/1993 | Itoh | 318/685 |
| 5,335,115 A | 8/1994 | Kawai et al. | 359/696 |
| 5,428,260 A | 6/1995 | Suzuki | 310/323 |
| 5,448,328 A | 9/1995 | Suzuki et al. | 354/400 |
| 5,500,578 A * | 3/1996 | Kawamura | 318/116 |
| 5,633,553 A | 5/1997 | Suzuki | 310/323 |
| 5,684,353 A | 11/1997 | Fujimoto et al. | 310/323 |
| 5,757,108 A | 5/1998 | Suzuki | 310/49 R |
| 5,939,851 A * | 8/1999 | Kataoka et al. | 318/611 |
| 6,021,097 A * | 2/2000 | Kanno et al. | 368/64 |
| 6,100,654 A * | 8/2000 | Izukawa et al. | 318/114 |
| 6,107,720 A * | 8/2000 | Atsuta | 310/316.01 |

* cited by examiner

Primary Examiner—Michael C. Zarroli
(74) Attorney, Agent, or Firm—Fitzpatrick, Cella, Harper & Scinto

(57) ABSTRACT

A driving apparatus is provided for a vibration type motor which obtains a driving force by applying a periodic signal to an electro-mechanical energy conversion element portion of the vibration type motor. When the driven amount of the vibration type motor is small, the vibration type motor is driven by a high voltage in a frequency range with a high lower limit as compared with a case wherein the driven amount is not small, thereby making it possible to realize high-speed focusing and suppress electric power consumption.

33 Claims, 4 Drawing Sheets

DRIVING APPARATUS FOR VIBRATION TYPE MOTOR AND VIBRATION TYPE MOTOR DRIVING CONTROL METHOD

BACKGROUND OF THE INVENTION

1. Field of the Invention

The present invention relates to an optical apparatus and vibration type motor driving control method and, more particularly, to an optical apparatus made up of a lens incorporating a vibration type motor for focus adjustment and an apparatus body in which the lens is mounted and which supplies power to the vibration type motor and provides focus detection information, and a vibration type motor driving control method applied to the optical apparatus.

The above optical apparatus is, for example, a single-lens reflex camera having a vibration type motor incorporated in an exchangeable lens.

2. Related Background Art

Of conventional cameras using silver halide films, a single-lens reflex camera, in particular, is capable of exchanging lenses. As such exchangeable lenses, lenses with various focal lengths have been manufactured.

As such an exchangeable lens, an automatic focus control lens is available, which can automatically adjust the focus by driving the focus lens using a built-in motor. This motor is driven on the basis of focus detection information generated by the camera body. As this motor, a DC motor has been used. Recently, however, a vibration type motor has been widely used in place of the DC motor.

This vibration type motor can maintain high torque up to the range of small numbers of rotations, and hence requires no reduction gear. This motor has many advantages. For example, a reduction in size can be attained, and noise can be suppressed.

In the vibration type motor, a driving voltage generated on the basis of a plurality of periodic signals having different phases is applied to a built-in electromechanical energy conversion element to generate travelling waves, thereby rotating a rotating member. The vibration type motor is accelerated by sweeping the frequency (driving frequency) of a periodic signal from a frequency higher than the resonant frequency of the motor to the resonant frequency.

Recently, in a super-telephoto lens having a focal length of 300 mm or more, in particular, a strong demand has arisen for an increase in the driving speed of a focus adjustment motor. This is because such a super-telephoto lens is often used to shoot sports activity such as track-and-field events, and focus control that can faithfully follow quick movements of athletes is strongly demanded.

For driving the vibration type motor at high speed, there is a method in which the sweeping speed of the driving frequency is simply increased. In this method, however, the characteristics of the vibration type motor cannot follow the sweeping speed of the driving frequency, resulting in awkward movements.

In another method, the driving voltage applied to the vibration type motor is raised. FIGS. 1A and 1B are graphs respectively showing the electric power consumption (P) of the vibration type motor and the number of rotations (N) when the driving voltage applied the vibration type motor is doubled, with the ordinate representing a driving frequency f.

Referring to FIGS. 1A and 1B, curves Nx and Px respectively represent the number of rotations and electric power consumption at a general driving voltage value, whereas curves Ny and Py respectively represent the number of rotations and electric power consumption at a voltage twice as high as the general driving voltage.

As is obvious from FIG. 1B showing the numbers of rotations, when the driving voltage is doubled, the number of rotation almost doubles at the same driving frequency.

As is obvious from FIG. 1A, however, when the driving voltage is doubled, the power consumption of the vibration type motor almost doubles as well.

In a single-lens reflex camera, since power is supplied from a battery in the camera body to the exchangeable lens (no battery is installed in the exchangeable lens), the power that can be used by the exchangeable lens itself is limited accordingly.

As shown in FIGS. 1A and 1B, when the driving voltage to the vibration type motor is raised, and the driving frequency is decreased to f1 to increase the number of rotations of the vibration type motor to N3, the power consumption increases to P3. As a result, the voltage of the battery on the camera body side drops. This may cause operation errors in various actuators on the camera body side, resulting in an operation error in the camera.

As described above, if the driving voltage to the vibration type motor is simply raised to increase the number of rotations so as to drive the vibration type motor at high speed, a serious problem arises in the camera system.

SUMMARY OF THE INVENTION

According to one aspect of this invention, there is provided a driving apparatus for a vibration type motor which obtains a driving force by applying a periodic signal to an electro-mechanical energy conversion element portion, comprising a setting circuit (e.g., a microcomputer) for setting a driven amount of the vibration type motor, and a power supply circuit for supplying electric power to the driving circuit, wherein when the driven amount set by the setting circuit is smaller than a predetermined amount, the power supply circuit applies to the driving circuit a voltage higher than a voltage to be set when the driven amount is not less than the predetermined value.

According to one aspect of this invention, a vibration type motor driving control method is applied to a driving apparatus including a vibration type motor which obtains a driving force by applying a periodic signal to an electro-mechanical energy conversion element portion, a driving circuit for applying a periodic signal to the vibration type motor, and a power supply circuit for supplying electric power to the driving circuit, where the method comprises the setting step of setting a driven amount of the lens, and the power supply voltage selection step of, when the driven amount set in the setting step is smaller than a predetermined value, applying to the driving circuit a voltage higher than a voltage to be set when the driven amount is less than the predetermined value.

DETAILED DESCRIPTION OF THE PREFERRED EMBODIMENTS

The embodiments of the present invention will be described below with reference to the accompanying drawings.

(First Embodiment)

Figure 2:
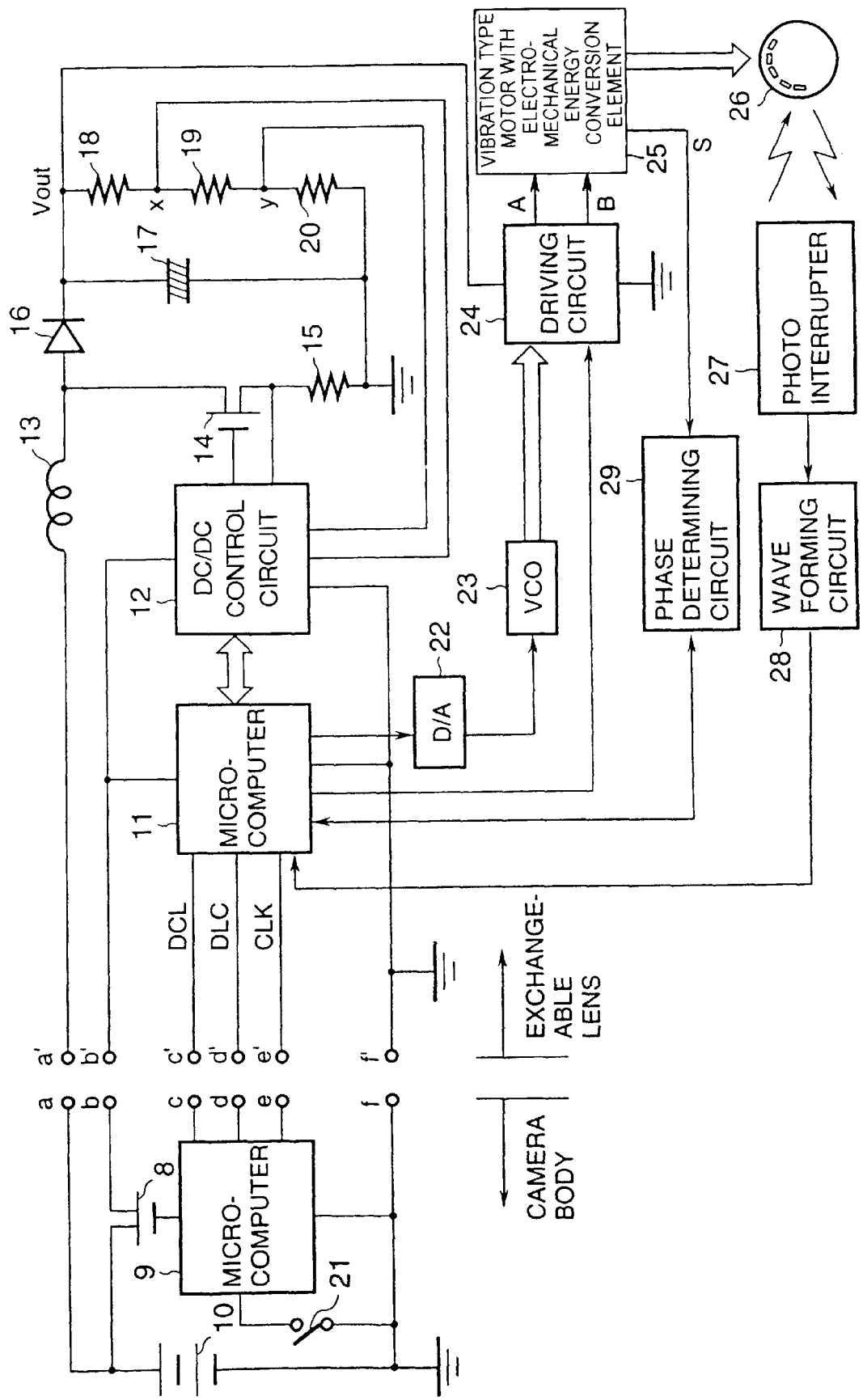
FIG. 2 is a circuit diagram showing the arrangement of a control circuit arranged in a camera body and exchangeable lens according to the first embodiment of the present invention.

FIG. 2 is a circuit diagram showing the arrangement of a control circuit arranged in a camera body and exchangeable lens according to the first embodiment of the present invention.

Referring to FIG. 2, this arrangement includes a power supply battery 10 housed in the camera body, a microcomputer 9 on the camera body side, a switch 21 that is turned on when the shutter button (two-stroke button) is pressed to the first-stroke position, and a transistor 8 for power supply which is controlled by the microcomputer 9.

A microcomputer 11 controls the overall circuit on the exchangeable lens side.

The camera body has terminals a to f. The terminal a is the positive terminal of the battery 10; the terminal b, a power supply terminal; the terminal c, a terminal for transferring data from the microcomputer 9 of the camera body to the microcomputer 11 of the exchangeable lens; the terminal d, a terminal for transferring data from the microcomputer 11 of the exchangeable lens to the microcomputer 9 of the camera body; the terminal e, a terminal for transferring a sync clock for data transfer; and the terminal f, the negative terminal of the battery 10.

Terminals a' to f' are those on the exchangeable lens side which correspond to the terminals a to f. When the exchangeable lens is mounted in the camera body, the corresponding terminals are connected to each other.

A control circuit 12 controls a DC/DC converter. The control circuit 12 is controlled by I/O data from the microcomputer 11.

The DC/DC converter is a boosting circuit and comprised of a coil 13, switching FET 14, feedback resistor 15, diode 16 for preventing current backflow, rectifying capacitor 17, and voltage-dividing resistors 18, 19, and 20.

The gate of the FET 14 is controlled by the control circuit 12. The node between the FET 14 and the feedback resistor 15 is connected to the control circuit 12 to constitute a so-called current feedback type DC/DC converter. The diode 16 serves as a diode for preventing the backflow of a current from the rectifying capacitor 17 to the battery 10.

An output voltage Vout from the DC/DC converter is sent to a driving circuit 24 (to be described later) and divided by the voltage-dividing resistors 18, 19, and 20 to be fed back from the node (point x) between the voltage-dividing resistors 18 and 19 or the node (point y) between the voltage-dividing resistors 19 and 20 to the control circuit 12. The control circuit 12 selects the voltage at the point x or the voltage at the point y in accordance with a command from the microcomputer 11, and controls the output voltage Vout from the DC/DC converter in accordance with the selected voltage.

A D/A converter 22 converts digital data output from the output port of the microcomputer 11 and indicating a driving frequency into an analog voltage. A VCO (voltage/frequency converter) 23 is connected to this D/A converter and generates a rectangular wave having a frequency corresponding to the input analog voltage.

The driving circuit 24 drives the vibration type motor and uses the output voltage Vout from the DC/DC converter as power. The output terminal of the VCO 23 and the output port of the microcomputer 11 are connected to the driving circuit 24. A vibration type motor 25 is driven by driving voltages having phases A and B with a phase difference of 90°, transmitted from the driving circuit 24.

The vibration type motor 25 outputs an S-phase signal indicating its own driven state. This S-phase signal is input to the input port of the microcomputer 11 through a phase determining circuit 29.

The exchangeable lens is driven by the vibration type motor 25. Since the driving mechanism of the vibration type motor 25 is known well, a description thereof will be omitted.

A pulse plate 26 rotates with rotation of the vibration type motor 25. The rotational motion of the pulse plate 26 is detected by a photo interrupter 27. The detection output from the photo interrupter 27 is input to the input port of the microcomputer 11 on the lens side through a wave forming circuit 28.

The operation of the control circuit having the above arrangement will be described with reference to FIG. 3.

Figure 3:
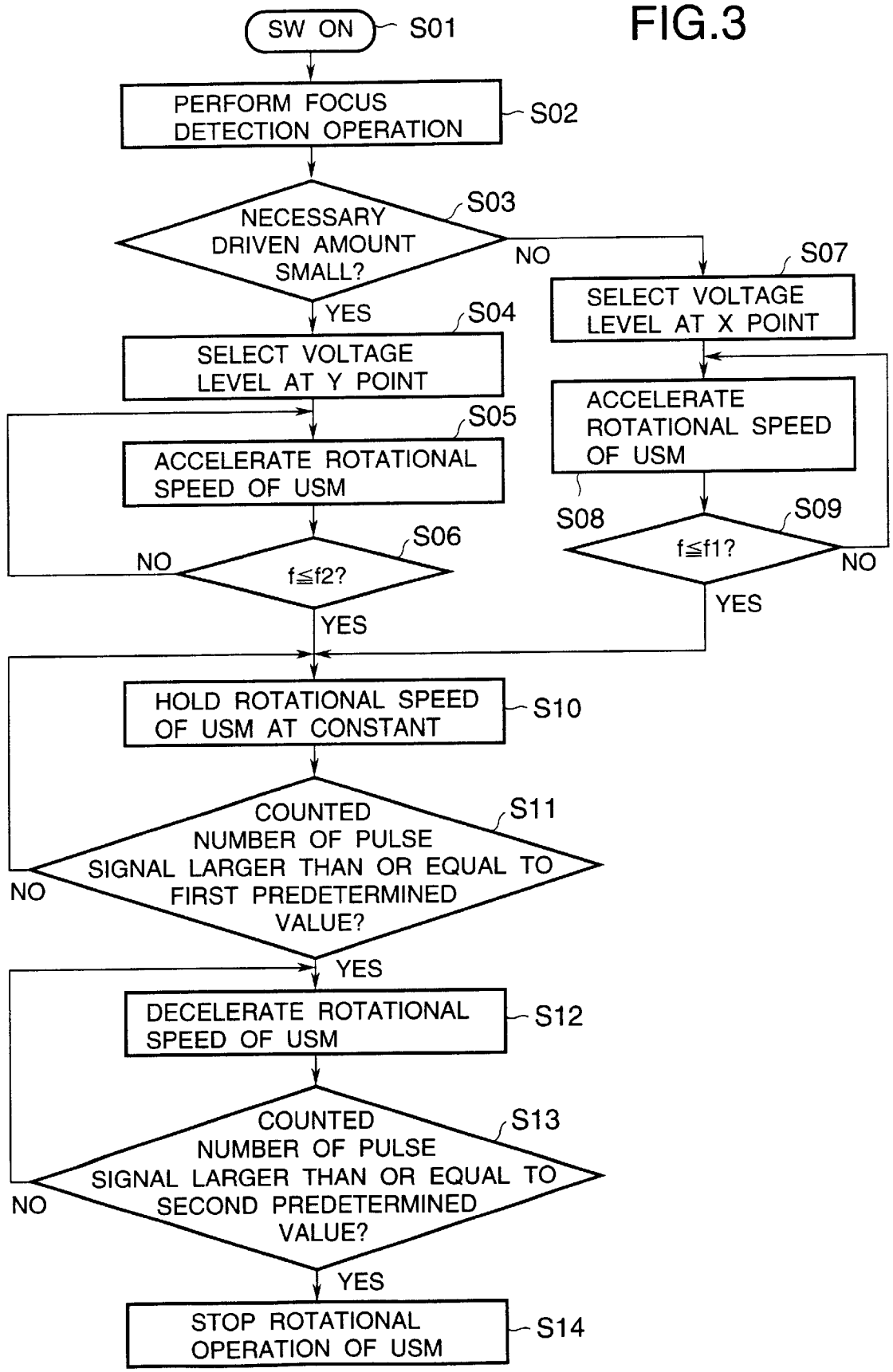
FIG. 3 is a flow chart showing the operation of the control circuit.

FIG. 3 is a flow chart showing the operation of the control circuit. This operation will be described in the order of step numbers (S).

S01: When the shutter button of the camera body is pressed to the first-stoke position, the switch 21 is turned on. As a consequence, a focus detection circuit (not shown) on the camera body side starts its operation. In addition, when the switch 21 is turned on, the microcomputer 9 on the camera body side turns on the power supply transistor 8 to start the supply of electric power to the microcomputer 11 and control circuit 12 through the terminals b and b'.

S02: The defocus information of the photographing lens which is obtained by the focus detecting operation by the focus detection circuit is transferred from the microcomputer 9 of the camera body to the microcomputer 11 on the lens side through the terminals c and c'. The defocus information indicates the degree of defocus.

S03: The microcomputer 11 calculates the driven amount of the exchangeable lens on the basis of this defocus information, and then determines on the basis of the calculated driven amount whether the necessary driven amount is small. If it is determined that the necessary driven amount is small, the flow advances to step S04. Otherwise, the flow advances to step S07. Note that a small driven amount is an amount smaller than the predetermined driven amount of the exchangeable lens.

S04: If it is determined that the necessary driven amount is small, the microcomputer 11 causes the control circuit 12 of the DC/DC converter to select the divided voltage at the point y as a feedback voltage. As a consequence, the driving voltage of the vibration type motor is set to a high voltage. This operation will be described in detail later.

Figure 1A:
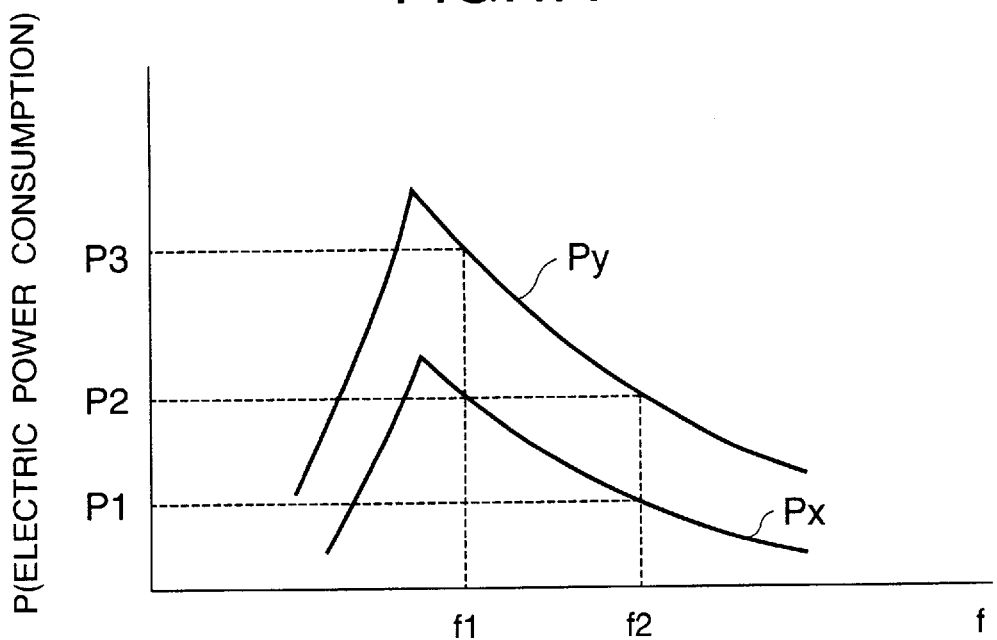
FIGS. 1A and 1B are graphs respectively showing electric power consumption (P) of the vibration type motor and the number of rotations (N) when the driving voltage applied to the vibration type motor is doubled, with the ordinate representing a driving frequency f.
Figure 1B:
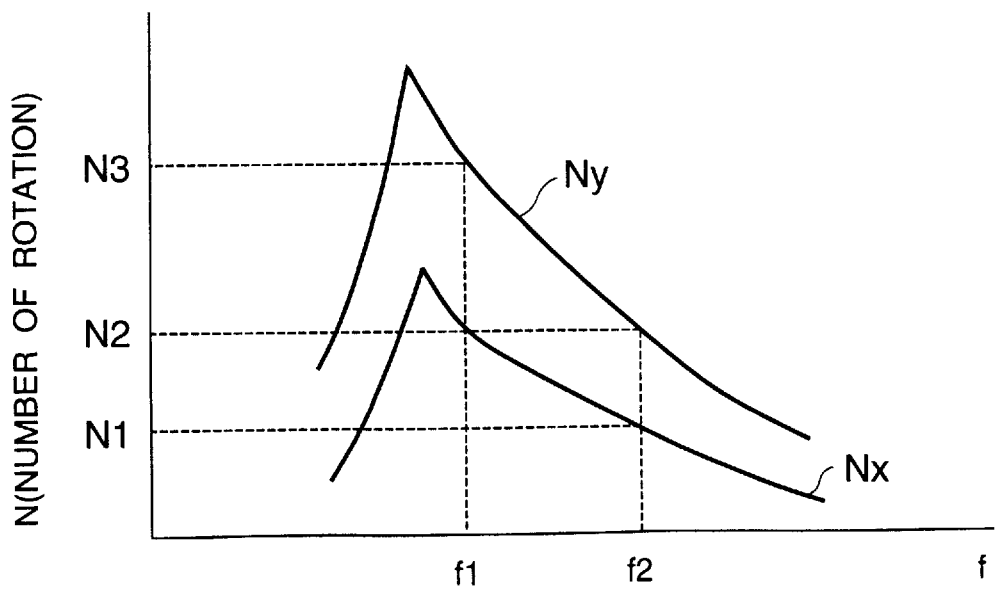

S05: The microcomputer 11 on the lens side sets digital data indicating the driving frequency of the vibration type motor 25 to a large value first, and sends it to the D/A converter 22. The microcomputer 11 then gradually decreases the value of the digital data. Since the input analog voltage of the VCO 23 gradually drops from a high value, the frequency (driving frequency) f of the rectangular wave output from the VCO 23 is swept from a high frequency to a lower frequency. The driving circuit 24 of the vibration type motor generates driving voltages having the phases A and B difference of 90° on the basis of this rectangular wave. As shown in FIGS. 1A and 1B, therefore, the number of rotations of the vibration type motor gradually increases with a decrease in driving frequency. Referring to FIG. 3, the vibration type motor is abbreviated as USM.

S06: The microcomputer 11 keeps decreasing the digital data while the driving frequency f is higher than a predetermined frequency f2 (see FIGS. 1A and 1B). If the driving frequency f becomes equal to or lower than the predetermined frequency f2, the flow advances to step S10.

S07: If the microcomputer 11 determined in step S03 that the driven amount of the exchangeable lens is not small, the microcomputer 11 causes the control circuit 12 of the DC/DC converter to select the divided voltage at the point x as a feedback voltage. As a consequence, the driving voltage of the vibration type motor is set to a low voltage. This operation will be described in detail later.

S08: The vibration type motor is accelerated as in step S05.

S09: If the driving frequency f is higher than a predetermined frequency f1 (f1<f2; see FIGS. 1A and 1B), the microcomputer 11 keeps decreasing the digital data. If the driving frequency f becomes equal to or lower than the predetermined frequency f1, the flow advances to step S10.

S10: The microcomputer 11 on the lens side fixes the digital data, which is to be output to the D/A converter 22, to the current value, and stops sweeping the driving frequency, thereby holding the rotational speed of the vibration type motor 25 at a constant speed.

S11: A pulse signal generated in accordance with the rotation of the vibration type motor 25 is input from the wave forming circuit 28 to the input port of the microcomputer 11. The number of input pulse signals is counted by the microcomputer 11. The microcomputer 11 holds the rotational speed of the vibration type motor 25 at the constant speed until the count value reaches a first predetermined value. When the count value reaches the first predetermined value , the flow advances to step S12.

S12: Upon determining that the exchangeable lens has moved near to a target driving position, the microcomputer 11 starts decelerating the vibration type motor 25. That is, the microcomputer 11 gradually increases the driving frequency indicated by digital data sent to the D/A converter 22. With this operation, the input analog voltage to the VCO 23 rises. As a consequence, the frequency of the rectangular wave output from the VCO 23 is swept to a high frequency, and the frequency of the driving voltage applied to the vibration type motor 25 is also swept to a high frequency. Consequently, as shown in FIGS. 1A and 1B, the number of rotations of the vibration type motor 25 decreases, and the motor is decelerated.

S13: The microcomputer 11 keeps decelerating the vibration type motor 25 until the number of pulses counted by the microcomputer 11 reaches a second predetermined value (second predetermined value>first predetermined value). When the number of pulses reaches the second predetermined value, the flow advances to step S14.

S14: Upon determining that the exchangeable lens has reached the target driving position, the microcomputer 11 stops driving the vibration type motor 25. More specifically, the microcomputer 11 abruptly increases the driving frequency indicated by the digital data sent to the D/A converter 22 to abruptly change the frequency of the driving voltage applied to the vibration type motor 25 to a high frequency at which the vibration type motor 25 stops.

Assume that the voltage-dividing resistors 18, 19, and 20 respectively have resistances R18, R19, and R20. Letting Vr (not shown) be a reference voltage value in the control circuit 12 of the DC/DC converter, if the divided voltage at the point x is selected as a feedback voltage by the control circuit 12, the output voltage Vout from the DC/DC converter is given by $$Vout=Vr\times(R18+R19+R20)/(R19+R20)$$

If the divided voltage at the point y is selected as a feedback voltage, the output voltage Vout from the DC/DC converter is given by $$Vout=Vr\times(R18+R19+R20)/R20$$

As described above, when the voltage at the point y is selected as a feedback voltage, the output voltage Vout becomes higher and hence the driving voltage to the vibration type motor 25 becomes higher than when the voltage at the point x is selected.

If R19=R20, the driving voltage obtained by selecting the voltage at the point y is twice that obtained by selecting the voltage at the point x.

As is obvious from steps S03 and S04, since the voltage at the point y is selected when the necessary driven amount of the exchangeable lens is small, a high driving voltage is set, and a curve Ny shown in FIG. 1B is used. When the necessary driven amount of the exchangeable lens is small, therefore, the large number of rotations is obtained. In addition, when the necessary driven amount of the exchangeable lens is not small, the obtained number of rotation is small and, therefore, the electric power consumption of the exchangeable lens is reduced.

When the necessary driven amount of the exchangeable lens is small, since the vibration type motor 25 is driven for a short period of time without increasing the number of rotations much, the frequency of the driving voltage is kept high. Referring to FIG. 1A, therefore, as the motor is driven while the driving frequency is not decreased below, for example, f2, the electric power consumption of the vibration type motor 25 does not increase beyond P2 even if the driving voltage is doubled. However, since the driving voltage is doubled, the number of rotations reaches N2, as shown in FIG. 1B. This number of rotation is almost equal to that when the driving frequency of a general driving voltage is decreased to f1.

The electric power consumption of the motor does not exceed P2 regardless of whether the necessary driven amount of the exchangeable lens is small or not. This eliminates the chance that excessive electric power consumption will cause operation errors in other devices in a camera system as in the prior art. In addition, when the necessary driven amount of the exchangeable lens is small, high-speed driving operation can be performed.

In a scene which requires high motion tracking performance as in continuously shooting of some sports activity, the exchangeable lens is often driven in small amounts. The capability of increasing the focusing speed in driving the exchangeable lens in small amounts will provide great effect in terms of motion tracking performance. The feature of raising the driving voltage of the vibration type motor 25 only when the exchangeable lens is driven in small amounts as in the present invention makes it possible to improve the reliability of the camera system without affecting the overall camera system.

(Second Embodiment)

The second embodiment will be described next.

Since the arrangement of the second embodiment is basically the same as that of the first embodiment, only different portions will be described below.

Figure 4:
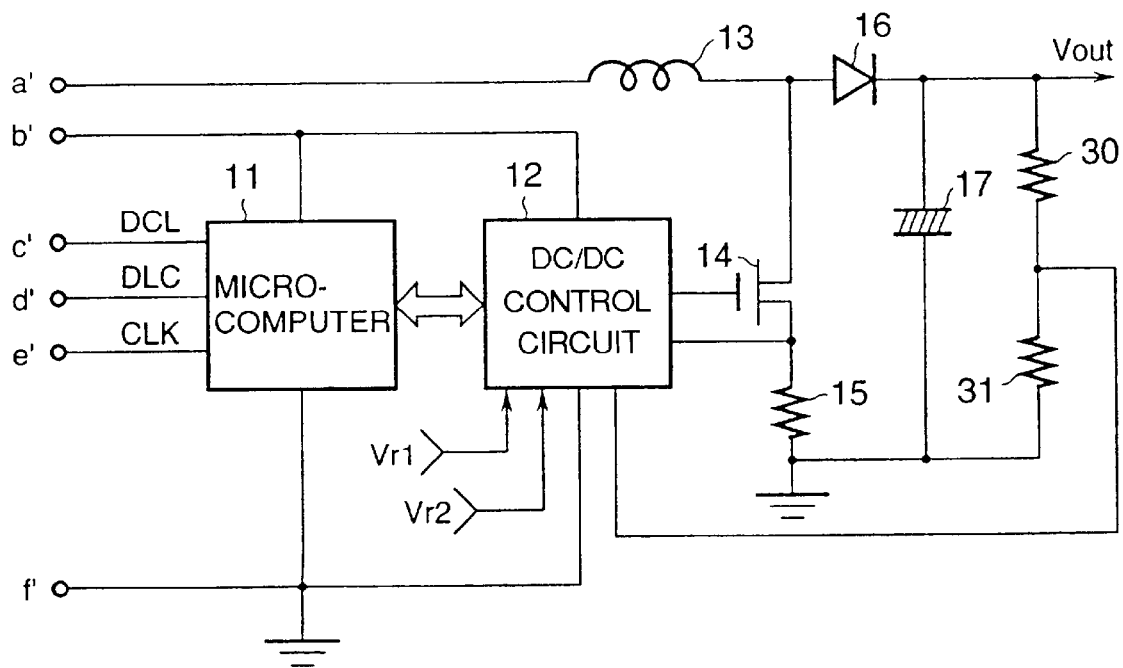
FIG. 4 is a circuit diagram showing the arrangement of a control circuit arranged in an exchangeable lens according to the second embodiment.

FIG. 4 shows the arrangement of a control circuit arranged in an exchangeable lens according to the second embodiment. FIG. 4 mainly shows portions that differ from the control circuit shown in FIG. 2. The same reference numerals as in FIG. 2 denote the same parts in FIG. 4, and an illustration of the components denoted by reference numerals 22 to 28 and the components of the camera body is omitted.

The second embodiment differs from the first embodiment in a portion for switching driving voltage values for the vibration type motor.

Two reference voltages Vr1 and Vr2 (Vr1>Vr2) are input to a control circuit 12 of a DC/DC converter. An output voltage Vout from the DC/DC converter is divided by resistors 30 and 31 to be fed back to the control circuit 12. Assume that the resistors 30 and 31 respectively have resistances R30 and R31.

As in the first embodiment, the control circuit 12 selects the reference voltage Vr1 or Vr2 in accordance with the driven amount of the exchangeable lens which is calculated by a microcomputer 11 on the lens side. More specifically, if the necessary driven amount of the exchangeable lens is smaller than a predetermined value, the reference voltage Vr1 is selected. In this case, the output voltage Vout from the DC/DC converter is given by $$Vout = Vr1 \times (R30+R31)/R31$$

If the necessary driven amount of the exchangeable lens is equal to or larger than the predetermined value, the reference voltage Vr2 is selected. In this case, the output voltage Vout from the DC/DC converter is given by $$Vout = Vr2 \times (R30+R31)/R31$$

This output voltage Vout is lower than that set when the necessary driven amount of the exchangeable lens is small.

Other operations of the control circuit are the same as those in the first embodiment.

In this manner, in the second embodiment as well, high-speed focusing operation can be realized, and electric power consumption can be suppressed low.

The present invention can be applied to a system made up of a plurality of devices or an apparatus including one device.

What is claimed is:

1. A driving apparatus for a vibration type motor, in which a periodic signal is applied to an electro-mechanical energy conversion element portion of the vibration type motor to generate a vibration therein and drive a driven member of the vibration type motor with a driving force, the driving apparatus comprising:

a setting circuit that sets a movement amount of the driven member of the vibration type motor;

a driving circuit that applies a periodic signal to the electro-mechanical energy conversion element portion of the vibration type motor; and a power supply circuit that supplies electric power to said driving circuit;

wherein said power supply circuit supplies a first voltage to said driving circuit when the movement amount of the driven member set by said setting circuit is equal to or larger than a predetermined movement amount, and said power supply circuit supplies a second voltage higher than the first voltage to said driving circuit when the movement amount set by said setting circuit is smaller than the predetermined movement amount.

2. An apparatus according to claim 1, wherein said driving circuit applies a periodic signal having a first amplitude to the electro-mechanical energy conversion element portion of the vibration type motor when the movement amount of the driven member set by said setting circuit is equal to or larger than the predetermined movement amount, and said driving circuit applies a periodic signal having a second amplitude larger than the first amplitude to the electro-mechanical energy conversion element portion of the vibration type motor when the movement amount set by said setting circuit is smaller than the predetermined movement amount.

3. An apparatus according to claim 2, wherein the driving circuit applies the periodic signal having the second amplitude so that an electric power consumption of said power supply circuit does not exceed a predetermined electric power consumption.

4. An apparatus according to claim 1, wherein said driving circuit changes the frequency of the periodic signal applied to said vibration type motor in a first frequency range from a predetermined high frequency to a first frequency which is lower than the predetermined high frequency and is higher than a resonant frequency when the movement amount set by said setting circuit is equal to or larger than a predetermined movement amount, and said driving circuit changes the frequency of the periodic signal applied to the electro-mechanical energy conversion element portion of the vibration type motor in a second frequency range from the predetermined high frequency to a second frequency lower than the predetermined high frequency and higher than the first frequency within the first frequency range when the movement amount is smaller than the predetermined movement amount.

5. An apparatus according to claim 1, wherein said power supply circuit includes a feedback type DC/DC converter having a plurality of voltage-dividing resistors connected in series with an output terminal of said power supply circuit.

6. An apparatus according to claim 5, wherein said power supply circuit selects one of a plurality of voltages obtained when said plurality of voltage-dividing resistors divide the output voltage in accordance with the movement amount set by said setting circuit, and feeds back the selected voltage to said DC/DC converter.

7. An apparatus according to claim 1, wherein said power supply circuit includes a DC/DC converter which has a plurality of different reference voltages and changes an output voltage in accordance with an input voltage.

8. An apparatus according to claim 7, wherein said power supply circuit selects one of the plurality of reference voltages in accordance with the movement amount set by said setting circuit, and inputs the selected voltage to said DC/DC converter.

9. An apparatus according to claim 1, wherein said vibration type motor is incorporated in a lens in an optical apparatus.

10. A driving control method for a driving apparatus including a vibration type motor, in which a driving circuit applies a periodic signal to an electro-mechanical energy conversion element portion of the vibration type motor to generate a driving force that drives a driven member, and a power supply circuit that supplies electric power to the driving circuit, said method comprising:

a setting step of setting a movement amount of the driven member driven by the driving force of the vibration type motor; and a power supply voltage selection step of selecting a first voltage of the electric power supplied by the power supply circuit to the driving circuit when the movement amount set in the setting step is equal to or larger than a predetermined movement amount, and selecting a second voltage of the electric power to be supplied by the power supply circuit, higher than the first voltage, when the movement amount set in the setting step is smaller than the predetermined movement amount.

11. A method according to claim 10, wherein
the power supply circuit includes a feedback type DC/DC converter including a plurality of voltage dividing resistors connected in series with an output terminal of the power supply circuit, and
said power supply voltage selection step comprises steps of selecting one of a plurality of voltages obtained when the plurality of voltage-dividing resistors divide the output voltage in accordance with the movement amount set in the setting step, and feeding back the selected voltage to the DC/DC converter.

12. A method according to claim 10, wherein
the power supply circuit includes a DC/DC converter which has two different reference voltages, generates an output voltage in accordance with an input voltage, and changes the output voltage in accordance with the input voltage, and
said power supply voltage selection step comprises steps of selecting one of the two reference voltages in accordance with the movement amount set in said setting step, and inputting the selected reference voltage to the DC/DC converter.

13. A method according to claim 10, wherein said power supply voltage selection step comprises steps of selecting a high voltage from among the plurality of power supply voltages output from the power supply section and sending the selected voltage to the driving circuit when the movement amount set in said setting step is smaller than the predetermined movement amount.

14. A driving apparatus for a vibration type motor in which a periodic signal is applied to an electro-mechanical energy conversion element portion so as to generate a driving force that drives a driven member, said driving apparatus comprising:
a setting circuit that sets a movement amount of the driven member driven by the driving force of the vibration type motor;
a driving circuit that applies the periodic signal to the electro-mechanical energy conversion element portion of the vibration type motor; and
a power supply circuit that supplies electric power to said driving circuit;
wherein said power supply circuit changes the voltage of the electric power supplied to said driving circuit in accordance with the movement amount of the driven member set by said setting circuit.

15. An apparatus according to claim 14, wherein said power supply circuit changes the voltage so as to apply a first voltage to said driving circuit when the movement amount of the driven member set by said setting circuit is equal to or larger than a predetermined movement amount, and to apply a second voltage higher than the first voltage to said driving circuit when the movement amount of the driven member set by said setting circuit is smaller than the predetermined movement amount.

16. A driving apparatus for a vibration type motor in which a periodic signal is applied to an electro-mechanical energy conversion element portion of the vibration type motor so as to generate a driving force that drives a driven member, said driving apparatus comprising:
a microcomputer that sets a movement amount of the driven member driven by the driving force of the vibration type motor;
a driving circuit that applies the periodic signal to the electro-mechanical energy conversion element portion of the vibration type motor; and
a power supply circuit that supplies electric power to the driving circuit,
wherein said microcomputer changes the voltage of the electric power supplied by said power supply circuit in accordance with the movement amount of the driven member set by said microcomputer.

17. An apparatus according to claim 16, wherein said power supply circuit changes the voltage of the electric power supplied by said power supply circuit so as to apply a first voltage to the driving circuit when the movement amount of the driven member set by said microcomputer is equal to or larger than a predetermined movement amount, and to apply a second voltage higher than the first voltage to said driving circuit when the movement amount of the driven member set by said microcomputer is smaller than the predetermined movement amount.

18. A driving control method for a driving apparatus including a vibration type motor having a driving circuit that applies a periodic signal to an electro-mechanical energy conversion element of the vibration type motor so as to drive a driven member with a driving force, and a power supply circuit that supplies electric power having a voltage to the driving circuit, said method comprising:
a setting step of setting a movement amount of the driven member driven by the driving force of the vibration type motor; and
a power supply voltage changing step of changing the voltage of the electric power supplied by the power supply circuit to the driving circuit in accordance with the movement amount of the driven member set in said setting step.

19. A method according to claim 18, wherein said power supply voltage changing step is a step of changing the voltage of the electric power supplied by the power supply circuit so as to apply a first voltage to the driving circuit when the movement amount of the driven member set in said setting step is equal to or larger than a predetermined movement amount, and to apply a second voltage higher than the first voltage to the driving circuit when the movement amount of the driven member set by in said setting step is smaller than the predetermined movement amount.

20. A driving control method for a driving apparatus including a vibration type motor having a driving circuit that applies a periodic signal to an electro-mechanical energy conversion element of the vibration type motor so as to drive a driven member with a driving force, a power supply circuit that supplies electric power having a voltage to the driving circuit, and a microcomputer, said method comprising:
a setting step of using the microcomputer to set a movement amount of the driven member driven by the driving force of the vibration type motor; and
a power supply voltage changing step of using the microcomputer to change the voltage of the electric power supplied by the power supply circuit to the driving circuit in accordance with the movement amount of the driven member set in said setting step.

21. A method according to claim 20, wherein said power supply voltage changing step performed by the microcomputer is a step of changing the voltage of the electric power supplied by the power supply circuit so as to apply a first voltage to the driving circuit when the movement amount of the driven member set in said setting step is equal to or larger than a predetermined movement amount, and to apply a second voltage higher than the first voltage to the driving circuit when the movement amount of the driven member set by in setting step is smaller than the predetermined movement amount.

22. An optical apparatus including a lens apparatus having a vibration type motor in which a periodic signal is applied to an electro-mechanical energy conversion element portion of the vibration type motor so as to obtain a driving force that drives a movable lens, and an image taking apparatus to which the lens apparatus is attached and which has an electric power supply circuit that supplies electric power to the lens apparatus and a movement amount information output circuit that outputs information concerning a movement amount of the movable lens, said optical apparatus comprising:
- a setting circuit that sets a movement amount of the movable lens driven by the driving force of the vibration type motor in accordance with the output of the movement amount information output circuit of the image taking apparatus;
- a driving circuit that receives a voltage and applies a periodic signal having an amplitude corresponding to the voltage to the vibration type motor; and
- a power supply circuit that supplies the voltage to the driving circuit, to which electric power is supplied by the electric power supply circuit of the image taking apparatus,
- wherein said power supply circuit changes the voltage in accordance with the movement amount of the movable lens set by said setting circuit.

23. An apparatus according to claim 22, wherein said power supply circuit changes the voltage so as to apply a first voltage to said driving circuit when the movement amount of the movable lens set by said setting circuit is equal to or larger than a predetermined movement amount, and to apply a second voltage higher than the first voltage to said driving circuit when the movement amount of the movable lens set by said setting circuit is smaller than the predetermined movement amount.

24. An apparatus according to claim 22, wherein the movement amount information output circuit is a focus detection circuit, and the information concerning the movement amount of the movable lens is information concerning a defocus amount of the movable lens detected by the focus detection circuit.

25. An optical apparatus including a lens apparatus having a vibration type motor in which a periodic signal is applied to an electro-mechanical energy conversion element portion of the vibration type motor so as to obtain a driving force that drives a movable lens, and an image taking apparatus to which the lens apparatus is attached and which has an electric power supply circuit that applies electric power to the lens apparatus and a movement amount information output circuit that outputs information concerning a movement amount of the movable lens, said optical apparatus comprising:
- a microcomputer that sets a driven amount of the movable lens driven by the driving force of the vibration type motor in accordance with the output of the movement amount information output circuit of the image taking apparatus;
- a driving circuit that receives a voltage and applies a periodic signal having an amplitude corresponding to the voltage to the vibration type motor; and
- a power supply circuit that supplies the voltage to the driving circuit, to which electric power is supplied by the electric power supply circuit of the image taking apparatus,
- wherein said microcomputer changes the voltage of said power supply circuit in accordance with the movement amount of the movable lens set by said microcomputer.

26. An apparatus according to claim 25, wherein said microcomputer changes the voltage of said power supply circuit so as to apply a first voltage to said driving circuit when the movement amount of the movable lens set by said microcomputer is equal to or larger than a predetermined movement amount, and to apply a second voltage higher than the first voltage to said driving circuit when the movement amount of the movable lens set by said microcomputer is smaller than the predetermined movement amount.

27. An apparatus according to claim 25, wherein the movement amount information output circuit is a focus detection circuit, and the information concerning the movement amount of said movable lens is information concerning a defocus amount of the movable lens detected by the focus detection circuit.

28. A lens apparatus attached to an image taking apparatus including an electric power supply circuit that supplies electric power to the lens apparatus and a movement amount information output circuit that outputs an information concerning a movement amount of a movable lens of the lens apparatus, which includes a vibration type motor in which a periodic signal is applied to an electro-mechanical energy conversion element portion of the vibration type motor so as to generate a driving force that drives the movable lens, said lens apparatus comprising:
- a setting circuit that sets a movement amount of the movable lens driven by the driving force of the vibration type motor in accordance with the output of the movement amount information output circuit of the image taking apparatus;
- a driving circuit that receives a voltage and applies a periodic signal having an amplitude corresponding to the voltage to the vibration type motor; and
- a power supply circuit that supplies the voltage to said driving circuit, to which electric power is supplied by the electric power supply circuit of the image taking apparatus,
- wherein said power supply circuit changes the voltage in accordance with the movement amount of the movable lens set by said setting circuit.

29. An apparatus according to claim 28, wherein said power supply circuit changes the voltage so as to apply a first voltage to said driving circuit when the movement amount of the movable lens set by said setting circuit is equal to or larger than a predetermined movement amount, and to apply a second voltage higher than the first voltage to said driving circuit when the movement amount of the movable lens set by said setting circuit is smaller than the predetermined movement amount.

30. An apparatus according to claim 28, wherein the movement amount information output circuit is a focus detection circuit, and the information concerning the movement amount of the movable lens is information concerning a defocus amount of the movable lens detected by the focus detection circuit.

31. A lens apparatus attached to an image taking apparatus including an electric power supply circuit that supplies electric power to the lens apparatus and a movement amount information output circuit that outputs information concerning a movement amount of a movable lens of the lens apparatus, which includes a vibration type motor in which a periodic signal is applied to an electro-mechanical energy conversion element portion of the vibration type motor so as to generate a driving force that drives a movable lens, said lens apparatus comprising:
- a microcomputer that sets a movement amount of the movable lens driven by the driving force of the vibration type motor in accordance with the output of the movement amount information output circuit of the image taking apparatus;
- a driving circuit that receives a voltage and applies a periodic signal having an amplitude corresponding to the voltage to the vibration type motor; and
- a power supply circuit that supplies the voltage to said driving circuit, to which electric power is supplied by the electric power supply circuit of the image taking apparatus,
- wherein said microcomputer changes the voltage of said power supply circuit in accordance with the movement amount of the movable lens set by said microcomputer.

32. An apparatus according to claim 31, wherein said microcomputer changes the voltage of said power supply circuit so as to apply a first voltage to said driving circuit when the movement amount of the movable lens set by said microcomputer is equal to or larger than a predetermined movement amount, and to apply a second voltage higher than the first voltage to said driving circuit when the movement amount of the movable lens set by said microcomputer is smaller than the predetermined movement amount.

33. An apparatus according to claim 31, wherein the movement amount information output circuit is a focus detection circuit, and the information concerning the movement amount of the movable lens is information concerning a defocus amount of the movable lens detected by the focus detection circuit.

* * * * *